US007141270B2

(12) United States Patent
Wittpahl et al.

(10) Patent No.: US 7,141,270 B2
(45) Date of Patent: Nov. 28, 2006

(54) METHOD FOR THE PRODUCTION OF MEMBRANE ELECTRODE ASSEMBLIES FOR FUEL CELLS

(75) Inventors: Sandra Wittpahl, Obertshausen (DE); Markus Robert Vogt, Frankfurt (DE); Karl-Anton Starz, Rodenbach (DE); Joachim Köhler, Gründau/Haingründau (DE)

(73) Assignee: Umicore AG & Co. KG, Hanau (DE)

( * ) Notice: Subject to any disclaimer, the term of this patent is extended or adjusted under 35 U.S.C. 154(b) by 267 days.

(21) Appl. No.: 10/308,491

(22) Filed: Dec. 3, 2002

(65) Prior Publication Data

US 2003/0118890 A1 Jun. 26, 2003

(30) Foreign Application Priority Data

Dec. 4, 2001 (DE) .............................. 101 59 476

(51) Int. Cl.
*H01M 8/10* (2006.01)
*H01M 4/86* (2006.01)
*B05D 5/12* (2006.01)

(52) U.S. Cl. .................. 427/115; 429/30; 429/40
(58) Field of Classification Search .............. 429/30, 429/40, 44; 427/115; 502/101
See application file for complete search history.

(56) References Cited

U.S. PATENT DOCUMENTS

| 4,876,115 A | 10/1989 | Raistrick |
| 5,211,984 A | 5/1993 | Wilson |
| 5,738,905 A | 4/1998 | Bevers |
| 5,910,378 A * | 6/1999 | Debe et al. .................. 429/42 |
| 6,197,147 B1 | 3/2001 | Bonsel et al. |
| 6,723,464 B1 * | 4/2004 | Tabata et al. ................ 429/43 |
| 2002/0034674 A1 | 3/2002 | Starz et al. |

FOREIGN PATENT DOCUMENTS

| EP | 1 037 295 B1 | 5/1999 |
| WO | WO 97/50142 | 6/1997 |

OTHER PUBLICATIONS

K. Koredesch und Simader, "Fuel Cells and their Applications," Verlag VCH, Weinheim, 1996.
O. Savadogo, "Emerging Membranes for Electochemical Systems: (I) solid polymer electrolyte membranes for Fuel Cell Systems," J. New Mat. Electrochem Systems, Oct. 22, 1997.

* cited by examiner

*Primary Examiner*—Patrick Joseph Ryan
*Assistant Examiner*—Thomas H. Parsons
(74) *Attorney, Agent, or Firm*—Kalow & Springut LLP; John J. Santalone, Esq.

(57) ABSTRACT

The present invention relates to a method for the production of a membrane electrode assembly comprising a polymer electrolyte membrane with two opposing membrane surfaces and a cathode and an anode electrode each comprising a catalyst layer and a gas distribution layer. Each catalyst layer is interposed between a membrane surface and the corresponding gas distribution layer. The catalyst layer of the cathode and/or the catalyst layer of the anode comprise at least two sub-layers. According to the present invention at least one of the sub-layers of the cathode electrode and/or the anode electrode is applied directly to the surface of the membrane while the remaining sub-layers are applied to the corresponding gas distribution layers. Finally the assembly of the coated membrane and the coated gas distribution layers is produced.

8 Claims, 2 Drawing Sheets

Prior Art

METHOD FOR THE PRODUCTION OF MEMBRANE ELECTRODE ASSEMBLIES FOR FUEL CELLS

FIELD OF THE INVENTION

The present invention relates to a method for the production of membrane electrode assemblies (MEA) for membrane fuel cells, especially polymer electrolyte membrane (PEM) fuel cells and direct-methanol fuel cells (DMFC).

BACKGROUND OF THE INVENTION

Fuel cells transform a fuel and an oxidizing agent at locally separated electrodes into current, heat and water. Hydrogen or a hydrogen-rich gas can be used as fuel and oxygen or air can be used as oxidizing agent. The process of energy transformation in fuel cells has an especially high efficiency. For this reason, fuel cells in combination with electric motors increasingly gain importance as an alternative to customary combustion engines.

Polymer electrolyte membrane fuel cells (PEM fuel cells) are especially well suitable for the use as energy transformer in vehicles as well as in stationary applications because of its compact assembly, power density and high efficiency. A PEM fuel cell can be operated with various fuels or combustion gases. For example, pure hydrogen or hydrogen containing reformate gases can be used in a PEM fuel cell. Liquid methanol can be used in a direct methanol fuel cell. These fuels are transformed oxidatively at the anode by releasing cationic species, in most cases protons, and electrons. As an oxidizing agent, pure oxygen or air is used at the cathode.

A membrane electrode assembly (MEA) has a multi-layer structure. A polymer electrolyte layer capable of conducting ions forms the central layer. Both of the surfaces of the membrane being opposite to each other are in contact with one catalytic layer on which are disposed hydrophobic impregnated gas diffusion layers (so-called GDLs or "backings"). The assembly consisting of a catalytic layer and a gas distribution substrate is called an electrode. One electrode is the cathode and the other electrode is the anode of the membrane electrode assembly.

The catalytic layers comprise a mixture of an ionomer with an electro-catalyst and eventually a bonding material like, e.g., PTFE. Precious metal blacks (small particles of platinum or its alloys) or supported catalysts of finely divided carbon particles, like carbon black, to which the precious metal is applied in high dispersion, are adequate for catalysts.

The polymer electrolyte membrane is formed of a proton-conducting polymer material and has a thickness of 20 µm to 200 µm. These materials are also called "ionomer", in short. Preferably, a tetrafluoroethylene-fluorovinylether copolymer with acid functions, especially sulphonic acid, is used. E.I. DuPont distributes such a material under the trademark Nafion®. But other materials, especially fluorine-free ionomer materials, such as sulphonated polyether ketones or sulphonated acryl ketones as well as doped polybenzimidazole can be used too.

The gas diffusion layers (GDLs) are made of high porous, electrically conducting carbon fiber substrates, such as, e.g., carbon fiber paper, carbon fiber fleece or a carbon fiber fabric with a thickness of 100 µm to 400 µm and a porosity of more than 50% up to 95%. The average pore diameter of the gas diffusion layer is in the range of 30 µm to 50 µm. In order to avoid the condensation of water in the pores of the gas diffusion layers, the carbon fiber substrates are impregnated by a suspension of a hydrophobic polymer, preferably polytetrafluoroethylene (PTFE), and finally calcined at a temperature in the range of the melting point of the polymer.

For the production of porous catalytic layers a paste, also called a catalyst ink, from ion conducting polymers dispersed in a solvent and an electrocatalyst is prepared, applied with known application techniques to the carbon fiber substrate and then the solvent is evaporated at moderate temperatures. The ion-conducting polymer in the catalyst ink is normally the same as the one of which the membrane is made. The porous structure of the electrode layers guarantees an optimal three-phase-contact between the ion conducting ionomer, the catalyst and the gaseous reactants. Thus, an easy exchange of protons between the polymer electrolyte membrane and the active centers of the catalyst is achieved.

Often it is necessary to repeat the coating several times, in order to achieve a certain load of precious metals in the catalyst layers.

There are a lot of different methods for the production of membrane electrode assemblies, but only a few are sufficient for industrial production, which means for a continuous production in high numbers at high economic costs.

It is known in the art that the polymer electrolyte membrane can be coated by a transfer method (decal method), wherein membranes in ion exchanged form (e.g., $Na^+$-form) are used. Thin catalyst layers are produced having a layer thickness of less than 10 µm. The method comprises many processing steps, is cumbersome and cost intensive and thus only adequate for small series.

It is also known in the art that there is a method for the application of electrode layers on a strip-shaped polymer electrolyte membrane; the method is used in the production of membrane electrode assemblies for PEM fuel cells. On the front and back surface of the polymer electrolyte membrane having a water content of 2 to 20 wt.-% a predetermined pattern of the catalyst layers is continuously printed using an ink containing an electrocatalyst. The printed catalyst layers are dried immediately after printing at elevated temperatures. In the following, the required gas diffusion layers are applied to the free surfaces of the catalyst layers by adhering, pressing or laminating. This method allows a continuous production of MEAs in industrial applications.

If the coating has to be repeated in order to achieve a desired concentration of precious metals, problems occur when using catalyst inks containing mostly organic solvents. Due to the absorption of the organic solvents, the membrane swells considerably and thus creates problems in keeping accurate dimensional stability. The membrane distorts and can fold.

The prior art describes a method for the continuous production of a composite comprising an electrode material, a catalyst material and a polymer electrolyte membrane wherein a dry catalytic powder containing the electrode material, the catalyst material and the material of the solid electrolyte is used to form a catalyst layer on a carrier. This catalyst layer is heated on the side not facing the carrier for softening the solid electrolyte material and is rolled under pressure onto the polymer electrolyte membrane. Disadvantages of this method are dust production and high production costs. If there are coarse powder particles in the catalytic material, the membrane can additionally be perforated (development of pinholes) when the powder is rolled on.

The prior art also describes a continuous method for the coating of a polymer electrolyte membrane with catalytic components, wherein a strip-shaped polymer membrane is pulled through a bath of platinum salt solution. The adhering salt is then reduced to precious metal in a gas stream or a further bath. With this method, the polymer electrolyte membrane is coated on both surfaces. The solution of platinum salt can penetrate the membrane that leads to a deposition of precious metal in the interior of the membrane during the reduction. Additionally, the membrane can be damaged or polluted, due to the very acidic metal salt solution and the reduction bath.

Furthermore, the prior art describes a method for the production of a membrane electrode assembly wherein the bonding of the polymer electrolyte membrane with the catalyst layers and the gas diffusion layers is achieved by a rolling process. This method is cumbersome, cost intensive and is not quite adequate for mass production.

Alternatively it is also known to apply the catalyst layers on the gas diffusion layers (GDLs). Thus, e.g., commercial electrodes of the company E-TEK are available which comprise a coating of a platinum supported catalyst on carbon black on a conventional gas diffusion layer. For the construction of a fuel cell, these electrodes are applied on both sides of a polymer electrolyte membrane. According to the prior art, the electrical contact of the electrodes to the membrane can be improved by impregnating the catalyst layers with, e.g., a solution of an ionomer. The impregnated electrodes are dried before using them in the production of a fuel cell. In the following, the electrodes are pressed or laminated with a polymer electrolyte membrane to form a membrane electrode assembly. During this production step high temperatures (>120° C.) and high pressures (up to 60 bar) are used, thus the membrane can be damaged or perforated by the gas diffusion layer (e.g., by sharp parts of the carbon fiber fleece or carbon fiber paper). Another disadvantage of the lamination process is that the porous gas diffusion layers, too, can be damaged or compressed irreversibly during the exertion of pressure. This can impair the electric properties and life of the completed membrane electrode assembly.

Based on the forgoing, there is a need in the art for a method for the production of a membrane electrode assembly that guarantees an optimal bonding of the catalyst layers with the polymer membrane. Furthermore, a method should be found which avoids the disadvantages of the multiple direct coating of the membrane (especially the accuracy problems when printed repeatedly) and the disadvantages of the pressing and lamination methods (especially the damaging of the membrane and/or the gas diffusion layer due to high pressures and high temperatures).

SUMMARY OF THE INVENTION

The method according to the present invention solves the above-mentioned problems of the known production methods by combining the method of direct coating with the lamination method for the production of membrane electrode assemblies. The catalyst layers of the anode and/or the cathode are each divided in at least two sub-layers, wherein the first sub-layers are applied directly to the membrane and the second sub-layers are applied to the corresponding gas diffusion layers. In the following, the two sub-layers of the anode are referred to as A1 and A2 and those of the cathode as K1 and K2, wherein digit 1 refers to the sub-layers applied directly to the membrane and digit 2 refers to the sub-layers applied to the gas distribution layer.

For a better understanding of the present invention together with other and further advantages and embodiments, reference is made to the following description taken in conjunction with the examples, the scope of which is set forth in the appended claims.

BRIEF DESCRIPTION OF THE DRAWING

Preferred embodiments of the invention have been chosen for purposes of illustration and description, but are not intended in any way to restrict the scope of the invention. The preferred embodiments of certain aspects of the invention are shown in the accompanying figures, wherein.

DETAILED DESCRIPTION OF THE INVENTION

Figure 1:
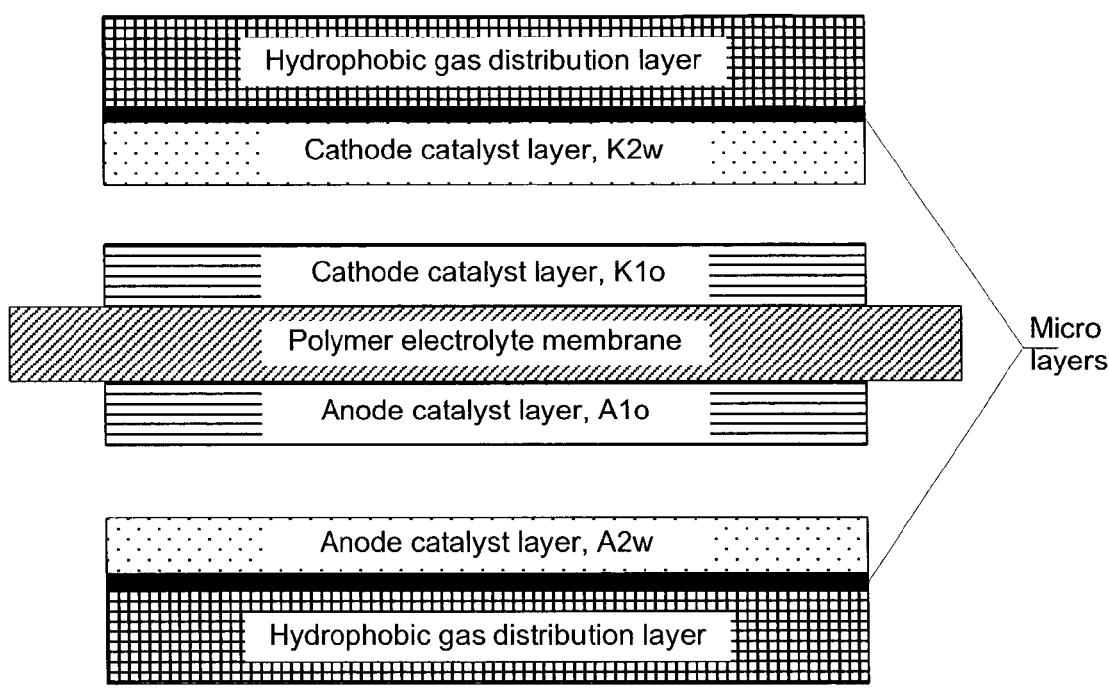
FIG. 1 illustrates the schematic structure of a membrane electrode assembly according to the present invention. The catalyst layer is applied to the polymer membrane as well as to the gas distribution layers.

The invention will now be described in connection with preferred embodiments. These embodiments are presented to aid in an understanding of the present invention and are not intended to, and should not be construed to, limit the invention in any way. All alternatives, modifications and equivalents, which may become obvious to those of ordinary skill on reading the disclosure are included within the spirit and scope of the present invention.

This disclosure is not a primer on methods for the production of a membrane electrode assembly, basic concepts known to those skilled in the art have not been set forth in detail.

In order to practice the method of the present invention, a first catalyst layer (anode layer A1 and/or cathode layer K1, is applied directly to the polymer membrane in a single coating step. Then, a second catalyst layer (cathode layer K2 and/or anode layer A2) is applied onto the corresponding gas distribution layers in a single coating step. The three resulting components (coated membrane and two coated gas diffusion layers) are then assembled to a membrane electrode assembly and incorporated in a PEM fuel cell. A lamination step at high pressures and high temperature is omitted and thus damaging of the membrane and/or the gas distribution layers is avoided. The typically used temperatures are at the level of the operation temperature of the PEM fuel cell (i.e., less than 100° C.). The pressure exerted during fitting of the MEA into a PEM single cell or a PEM stack is less than 5 bar.

The method according to the present invention enables the catalyst inks to be adapted to the substrates to be coated in order to achieve optimal coating results. For the sub-layers applied directly to the surface of the membrane, catalyst inks are preferably used which contain mainly organic solvents, i.e., the catalyst inks contain more than 50 up to 90 wt.-% of organic solvents. By direct coating using a catalyst ink containing mainly organic solvents a very good bonding of the catalyst layers to the polymer electrolyte membrane is guaranteed. Dimensional stability problems due to multiple coating steps are avoided.

In contrast, for the layers to be applied directly to the gas distribution layers, mostly catalyst inks are used which contain more than 50 up to 90 wt.-% water. Thus, the penetration depth of the ink into the hydrophobic-made gas distribution layer is minimized as much as possible.

For the coating of the membrane and the gas distribution layer with the sub-layers, known coating methods can be used which belong to the group of screen printing, offset printing, transfer printing, stencil printing, doctor blading or spraying. After the catalyst layers have been applied, they are dried at temperatures in the range of 50 to 150° C.

The suggested method permits giving different hydrophobic characteristics to the sub-layers of anode and cathode.

Surprisingly, the membrane electrode assemblies produced by the new method showed a better performance compared with those produced by the mentioned standard methods.

Having now generally described the invention, the same may be more readily understood through the following references to the following examples, which are provided by way of illustration and are not intended to limit the present invention unless specified.

EXAMPLES

The invention is described in more detail in the following examples, FIGS. 1 to 3 and the characteristics of two membrane electrode assemblies, which can be produced especially advantageously by the method of the present invention.

FIG. 1 shows the typical structure of a membrane electrode assembly according to the present invention comprising a polymer electrolyte membrane, the catalyst layers A1o and K1o applied to the membrane and the catalyst layers A2w and K2w applied to the hydrophobic gas distribution layers. The indices "o" and "w" of the catalyst layers indicate the catalyst inks containing mainly organic solvent (o) and mainly water (w), respectively. The intermediate layers between catalyst layers K1w or A1w and the gas distribution layers are optional. The intermediate layers are porous having an average pore diameter in the range of 0.1 µm and 1 µm. Therefore, they are often called micro layers. They are usually made of a mixture of carbon black and a hydrophobic polymer, as for example PTFE.

Figure 2:
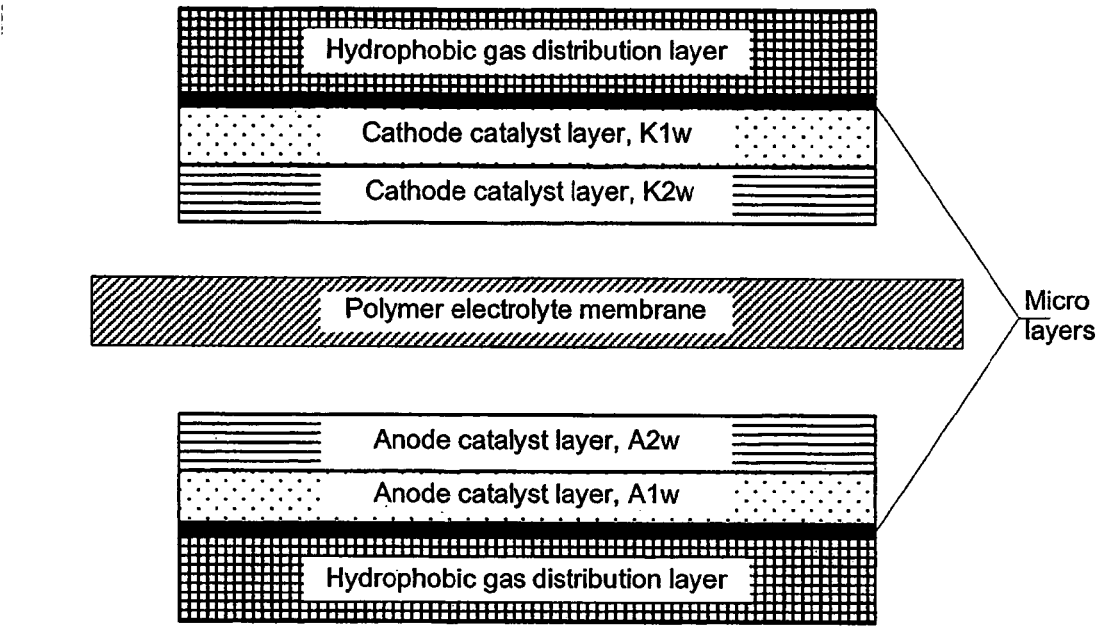
FIG. 2 illustrates the schematic structure of a membrane electrode assembly according to the prior art. The catalyst layers are only applied to the gas distribution layers.

FIG. 2 shows the typical structure of a membrane electrode assembly according to the prior art, which has been produced using water-containing catalyst inks. It has a polymer electrolyte membrane, the hydrophobic gas distribution layers and the catalyst layers A1w, A2w and K1w and K2w applied thereto. It was assumed that at least two coating steps A1w, A2w and K1w, K2w, respectively, were necessary for the application of the catalyst layers. The micro layers between the catalyst layers K1w or A1w and the gas distribution layers are optional.

Figure 3:
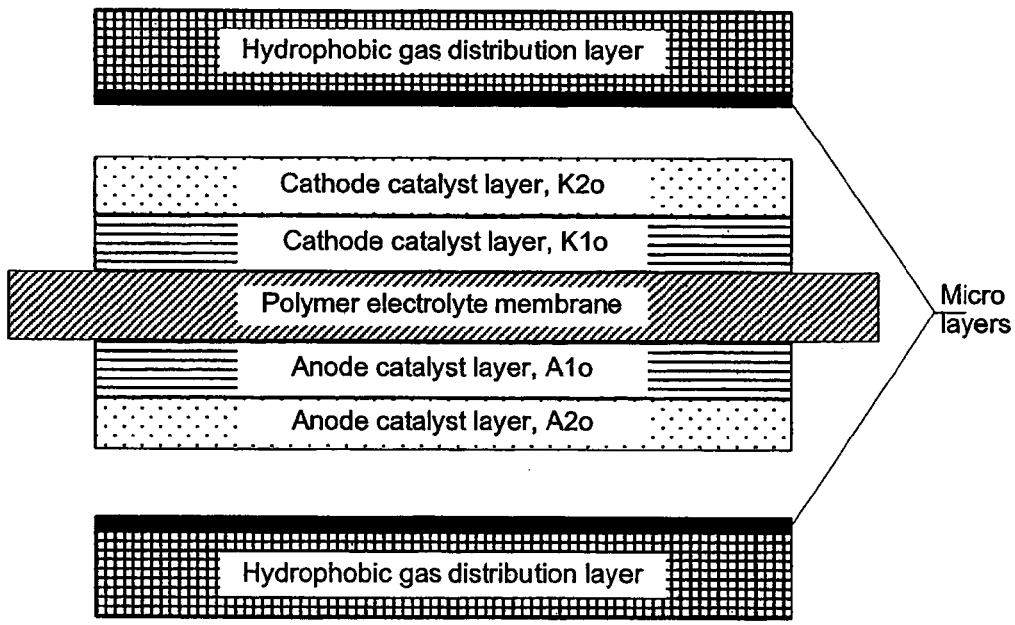
FIG. 3 illustrates shows the schematic structure of a membrane electrode assembly according to the prior art. The catalyst layers are only applied to the ionomer membrane.

FIG. 3 shows the typical structure of a membrane electrode assembly according to the prior art, which has been produced using organic catalyst inks. It has a polymer electrolyte membrane and hydrophobic gas distribution layers. The catalyst layers A1o, A2o and K1o, K2o were directly applied to the polymer electrolyte membrane. It was assumed that also for the application of these catalyst layers at least two coating steps A1o, A2o and K1o, K2o, respectively, were necessary for each of them. The micro layers between the catalyst layers K2o and A2o, respectively, and the gas distribution layers are optional.

For the application of the catalyst layers, the methods known from the prior art can be used. Suitable are the methods of painting, screen printing, offset printing, transfer printing, stencil printing, doctor blading or spraying. The catalyst materials used can be precious metals supported on carbon black, unsupported precious metal blacks (e.g., platinum black) or precious metals supported on oxide materials (e.g., Pt/Al$_2$O$_3$).

As cathode catalyst, preferably, a platinum catalyst on carbon black is used. The preferred loading of carbon black with platinum is in the range of about 20 to about 75 wt.-% related to the total weight of platinum and carbon black. As anode catalyst a catalyst is adequate which contains platinum and ruthenium in a mass relation of 2:1 on carbon black, whereby the concentration of the platinum group metals related to the total weight of the catalyst is again in the range of about 20 to about 70 wt.-%. Other catalyst materials are also usable.

The polymer electrolyte membrane is usually hydrophilic while the gas distribution layers are in most cases hydrophobic. Depending on the nature of the substrate, various surface characteristics develop which have to be taken into account when applying the catalyst layers. The present invention adapts the application method for the catalyst material to the characteristics of the corresponding substrate. For instance, for direct coating onto the polymer membrane, the catalyst ink should preferably be based on organic solvents (content of organic solvents about 50 to about 90 wt.-%). Thus, the adhering of the catalyst layer on the membrane is improved.

Reverse conditions exist when the catalyst ink is applied to the gas distribution layers. In this case better results can be achieved, when the hydrophobic gas distribution layers are coated with catalyst inks on mainly aqueous basis. The total water content of the ink should lie between about 50 and about 90 wt.-%.

For the production of the catalyst inks, the catalysts are dispersed in a solution of an ionomer. For the adjustment of the hydrophobic characteristics of the catalyst layers additionally dispersion agents, pore formers, wetting agents, hydrophobic polymer as, e.g., PTFE or other additives can be added to the ink. The preferred weight relation between electro-catalyst and ionomer in the ink is between 5:1 and 1:5.

For the coating of the hydrophobic gas distribution layers, catalyst inks are used which mainly contain water as solvent and are thus hydrophilic. The use of this hydrophilic catalyst inks reduces penetration into the pores of the hydrophobic gas distribution layers.

For the coating of the ionomer membrane inks are used, which mainly or entirely contain organic solvents. As possible organic solvents, for example, linear dialcohols can be used, as in known in the art.

Example 1

For the production of the membrane electrode assembly (MEA) according to the suggested method four catalyst inks having the following composition were produced:

| Ko: ink for the cathode containing mainly organic solvents (coating of the ionomer membrane) | |
|---|---|
| 15.0 g | supported Pt catalyst (40 wt.-% Pt on carbon black, company OMG) |
| 36.0 g | Nafion ® solution (10 wt.-% in dipropylene glycol) |
| 49.0 g | Dipropylene glycol |
| 100.0 g | |
| content of organic solvents: | 81.4 wt.-% |
| total water | 0.0 wt.-% |

-continued content:
Kw: ink for the cathode containing mainly water
(coating of the gas distribution layer)

| | |
|---|---|
| 13.0 g | supported Pt catalyst (40 wt.-% Pt on carbon black, company OMG) |
| 41.0 g | Nafion ® solution (10 wt.-% in water) |
| 30.0 g | water (salt-free) |
| 16.0 g | Dipropylene glycol |
| 100.0 g | |
| content of organic solvents: | 16.0 wt.-% |
| total water content: | 66.9 wt.-% |

Ao: ink for the anode containing mainly organic solvents
(coating of the ionomer membrane)

| | |
|---|---|
| 11.0 g | supported PtRu catalyst (40 wt.-% Pt/Ru on carbon black: 26.4 wt.-% Pt, 13.6 wt.-% Ru; catalyst according to U.S. Pat. No. 6,007,934) |
| 46.0 g | Nafion ® solution (10 wt.-% in a solution of dipropylene glycol) |
| 43.0 g | Dipropylene glycol |
| 100.0 g | |
| content of organic solvents: | 84.4 wt.-% |
| total water content: | 0.0 wt.-% |

Aw: ink for the anode containing mainly water
(coating of the gas distribution layer)

| | |
|---|---|
| 11.0 g | supported PtRu catalyst (40 wt.-% Pt/Ru on carbon black: 26.4 wt.-% Pt, 13.6 wt.-% Ru; catalyst according to U.S. Pat. No. 6,007,934) |
| 35.0 g | Nafion ® solution (10 wt.-% in water) |
| 30.0 g | water (salt-free) |
| 24.0 g | Dipropylene glycol |
| 100.0 g | |
| content of organic solvents: | 24.0 wt.-% |
| total water content: | 66.9 wt.-% |

The Nafion-solutions in dipropylene glycol were produced from an available Nafion-solution in low-boiling point alcohols (5% solution, Company DuPont), removing the alcohol and dissolving the Nafion in the glycol. In this solution the catalyst was suspended. The ionomer is in acidic condition in this solution. Nafion-solutions in water (10% solution) are commercially available.

The water-containing catalyst ink for the cathode (Kw) was applied to the first gas distribution layer (hydrophobic-made carbon fiber paper, Company Toray) by screen printing and dried in two steps at a temperature of 90° C. The loading of the cathode layer (K2w) produced in this manner was 0.2 mg Pt/cm$^2$, its active cell area 50 cm$^2$.

In a second production step a second gas distribution layer (hydrophobic-made carbon fiber paper, company Toray) was again coated by screen-printing with a water-containing catalyst ink for the anode (Aw) and dried at 90° C. The anode layer (A2w) produced in this manner had a loading of 0.15 mg Pt/cm$^2$ and 0.075 mg Ru/cm$^2$ and had an active area of 50 cm$^2$.

In a third production step, the catalyst inks containing mainly organic solvents for the cathode (Ko) were directly applied to the ionomer membrane and dried at 70° C. Finally the membrane coated on one side was rinsed in hot water having a temperature of 80° C. The loading of the cathode catalyst layer (K1o) produced in this manner was 0.25 mg Pt/cm$^2$ and its active cell area was 50 cm$^2$.

In a fourth production step, the catalyst ink containing mainly organic solvents for the anode (Ao) was applied to the backward side of the ionomer membrane (anode catalyst layer A1o) and again dried at 70° C. Finally the membrane coated with catalyst on both sides was rinsed in hot water having a temperature of 80° C. The loading of the membrane coated in this manner was 0.15 mg Pt/cm$^2$ and 0.075 mg Ru/cm$^2$ on the anode side and 0.25 mg Pt/cm$^2$ on the cathode side, its active cell area was 50 cm$^2$.

For the production of a MEA according to the present invention the membrane coated on both sides was combined with the gas distribution layers, as shown in FIG. 1, and incorporated into an PEM fuel cell. The total loading of the MEA produced in this manner was 0.9 mg precious metal/cm$^2$ (0.75 mg Pt/cm$^2$ and 0.15 mg Ru/cm$^2$). The cell voltages measured are shown in Table 1.

Comparison Example 1 (VB 1)

A membrane electrode assembly was produced according to the method shown in FIG. 2. The catalyst layer for anode and cathode were directly applied to the gas distribution layers using the catalyst inks Kw and Aw of example 1 and finally combined with a ionomer membrane (Nafion® 112, company DuPont, thickness of the membrane: 50 μm).

The cathode ink on aqueous basis (Kw) was directly applied by screen-printing to the first gas distribution layers (company Toray) and dried in two steps at 70° C. and 90° C., respectively. The loading of this first catalyst layer (K1w) was 0.2 mg Pt/cm$^2$. On this first layers, a second layer (K2w) was applied by screen printing and again dried in two steps at 70° C. and 90° C., respectively. Finally, the coated gas distribution layer was rinsed in water having a temperature of 80° C. The total loading of the cathode electrode produced in this manner was 0.4 mg Pt/cm$^2$, its active cell area was 50 cm$^2$. In a separate production step, a second gas distribution layer (company Toray) was also coated by screen-printing with the aqueous anode ink (Aw) and dried in two steps at 70° C. and 90° C., respectively. The precious metal loading of this first catalyst layer (A1w) was 0.2 mg/cm$^2$. On this first layer, a second layer of catalyst ink (A2w) was applied by screen printing and again dried in two steps at 70° C. and 90° C., respectively. Finally, the coated gas distribution layer was rinsed in hot water having a temperature of 80° C. The total loading of the anode electrode produced in this manner was 0.3 mg Pt/cm$^2$ and 0.15 Ru/cm$^2$, its active cell area was 50 cm$^2$.

For the production of the membrane-electrode unit an uncoated ionomer membrane (Nafion® 112, company DuPont, thickness of the membrane 50 μm), already swollen in water, was introduced between the cathode and the anode with the dried catalyst layers and pressed together for 10 minutes at a temperature of 150° C. and at a pressure of 20 bar.

The total loading of this MEA was 0.85 mg precious metal/cm$^2$ (0.7 mg Pt/cm$^2$ and 0.15 mg Ru/cm$^2$). The membrane electrode assembly produced in this manner was incorporated in a PEM fuel cell and measured. The measured cell voltages are shown in Table 1.

Comparison Example 2 (VB 2)

A membrane electrode assembly was produced according to the method shown in FIG. 3. The catalyst layers for cathode and anode using the catalyst inks Ko and Ao of example 1 were directly applied to the ionomer membrane (Nafion® 112, company DuPont, thickness of the membrane: 50 μm).

The cathode ink Ko was directly applied by screen printing on the ionomer membrane and dried in two steps at 70° C. and 90° C., respectively. The loading of this first catalyst layer (K1o) was 0.2 mg Pt/cm². On this first layer, a second layer (K2o) was applied by screen-printing and again dried in two steps at 70° C. and 90° C., respectively. The total loading of the cathode produced in this manner was 0.4 mg Pt/cm², its active cell area was 50 cm².

In a further production step the still uncoated surface of the ionomer membrane was also coated directly by screen-printing with the anode ink Ao and dried in two steps at 70° C. and 90° C., respectively. The precious metal loading of this first catalyst layer (A1o) was 0.2 mg/cm². On this first layer, a second layer (A2o) was applied by screen-printing and dried in two steps at 70° C. and 90° C., respectively. The total loading of the anode produced in this manner was 0.3 mg Pt/cm² and 0.15 mg Ru/cm², its active cell area was 50 cm². Finally, the membrane coated on both sides was rinsed in hot water having a temperature of 80° C.

The membrane electrode assembly produced in this manner was incorporated together with the gas distribution layer (hydrophobic-made carbon fiber paper, company Toray) into a PEM fuel cell and measured. The total load of the MEA was 0.85 precious metal/cm², comprising 0.7 mg Pt/cm² and 0.15 mg Ru/cm². The measured cell voltages are shown in Table 1.

Electrochemical Tests

Operation with Reformate Gas/Air

The membrane electrode assemblies produced according to example 1 and comparison examples VB1 and VB2 were incorporated into a PEM fuel cell having an active cell area of 50 cm². During the performance tests for the anode gas, a gas mixture of 40 vol.-% $H_2$, 35 vol.-% $N_2$, 25 vol.-% $CO_2$, 50 vppm CO with an additional air bleed of 3 vol.-% air was used. As cathode gas air was used. The cell temperature was 70° C. The anode gas humidification was made at 85° C. and the cathode gas humidification was made at 55° C. The pressure of the operation gases was 1 bar (absolute). The stoichiometry of the gases was 1.3 (anode gas) and 2.0 (cathode gas).

The measured cell voltages in reformate operation at a current density of 600 mA/cm² are shown in Table 1. It is obvious that the membrane electrode assembly produced according to the present invention shows a considerably higher cell voltage and a higher power density.

TABLE 1

Results of the performance tests

| Example | cell voltage at 600 mA/cm² | power density |
|---------|---------------------------|---------------|
| example 1 | 650 mV | 390 mW/cm² |
| VB 1 | 605 mV | 363 mW/cm² |
| VB 2 | 590 mV | 354 mW/cm² |

Operation with Methanol/Air (DMFC)

The membrane electrode assemblies produced according to example 1 and the comparison examples VB1 and VB2 were incorporated into a DMFC fuel cell with an active cell area of 50 cm². During the performance tests, a 2-molar methanol solution in water was used, the cell temperature was 60° C. As cathode gas air at a pressure of 1 bar (absolute) was used. For the MEA produced according to the present invention a power density (peak) of 100 mW/cm² was obtained. The membrane electrode assemblies according to the comparison examples had a power density of about 50 mW/cm².

While the invention has been described in connection with specific embodiments thereof, it will be understood that it is capable of further modifications and this application is intended to cover any variations, uses, or adaptations of the invention following, in general, the principles of the invention and including such departures from the present disclosure as come with the known or customary practice within the art to which the invention pertains and as may be applied to the essential features hereinbefore set forth and as follows in the scope of the appended claims.

What is claimed:

1. A method for manufacturing a membrane electrode assembly comprising a polymer electrolyte membrane, with two opposing membrane surfaces, and a cathode electrode and an anode electrode, each electrode comprising a catalyst layer and a gas distribution layer, and each catalyst layer is interposed between one membrane surface and the gas distribution layer corresponding to the catalyst layer's electrode, and wherein the catalyst layer of the cathode electrode or the catalyst layer of the anode electrode or both comprises at least two sub-layers, the method comprising applying at least one of the sub-layers directly to the membrane surface and the remaining sub-layers to the gas distribution layer corresponding to the sub-layer's electrode before assembly of the membrane electrode assembly, wherein the sub-layer or sub-layers applied directly to the membrane are manufactured from one or more catalyst inks containing mainly organic solvents and the sub-layers applied to the gas distribution layers are manufactured from one or more catalyst inks containing mainly water.

2. The method according to claim 1, wherein the assembly of the membrane electrode assembly is carried out by combining the membrane coated with catalyst layers with the two gas distribution layers coated with catalyst layers at pressures lower than about 5 bar and at temperatures lower than about 100° C.

3. The method according to claim 1, wherein the catalyst inks containing mainly water comprise a total water content of about 50 to about 90 wt.-% and the catalyst inks containing mainly organic solvents comprise a content of organic solvents of about 50 to about 90 wt.-%.

4. The method according to claim 3 wherein the application of the sub-layers onto the membrane and the gas distribution layers is accomplished by coating methods selected from the group consisting of screen printing, offset printing, transfer printing, stencil printing, doctor blading or spraying.

5. The method according to claim 4, wherein the application of the sub-layers onto the membrane and the gas distribution layers comprises drying of the sub-layers at temperatures in the range of about 50 to about 150° C.

6. A membrane electrode assembly for membrane fuel cells, having a cathode electrode with an associated catalyst layer and an anode electrode with an associated catalyst layer, wherein one or both of the catalyst layers each comprises at least two catalyst-containing sub-layers of different hydrophobicities.

7. A membrane electrode assembly for membrane fuel cells manufactured according to the method according to claim 1.

8. A polymer electrolyte fuel cell or a direct methanol fuel cell comprising the membrane electrode assembly produced according to the method in claim 1.

* * * * *